United States Patent
Martinez et al.

(10) Patent No.: US 11,796,841 B1
(45) Date of Patent: Oct. 24, 2023

(54) CONCENTRATED THERMAL TUNER FOR OPTICAL MICRODISK DEVICES

(71) Applicant: National Technology & Engineering Solutions of Sandia, LLC, Albuquerque, NM (US)

(72) Inventors: Nicholas Jacob Martinez, Albuquerque, NM (US); Anthony L. Lentine, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 419 days.

(21) Appl. No.: 17/210,833

(22) Filed: Mar. 24, 2021

Related U.S. Application Data (60) Provisional application No. 63/004,640, filed on Apr. 3, 2020.

(51) Int. Cl.
*G02F 1/01* (2006.01)
*G02F 1/025* (2006.01)

(52) U.S. Cl.
CPC ............ *G02F 1/0147* (2013.01); *G02F 1/025* (2013.01)

(58) Field of Classification Search
CPC .................. G02F 1/0147; G02F 1/025
See application file for complete search history.

(56) References Cited

U.S. PATENT DOCUMENTS

| | | | | |
|---|---|---|---|---|
| 2006/0051010 A1* | 3/2006 | Chu | ............ | G02B 6/12007 385/5 |
| 2014/0110572 A1* | 4/2014 | Li | ............ | G02F 1/025 250/227.23 |
| 2016/0047653 A1* | 2/2016 | Shkel | ............ | G01C 19/5691 73/504.13 |

OTHER PUBLICATIONS

Zortman, William A. et al., "Integrated CMOS Compatible Low Power 10Gbps Silicon Photonic Heater-Modulator," Optical Fiber Communications Conference 2012, Los Angeles, California (Mar. 2012).

Voigt, K. et al., "Performance of 40-GB/s DPSK Demodulator in SOI-Technology," in IEEE Photonics Technology Letters, 2008, vol. 20, pp. 614-616.

Derose, C. T. et al., "High Speed Travelling Wave Carrier Depletion Silicon Mach-Zehnder Modulator," 2012 Optical Interconnects Conference, Santa Fe, NM, pp. 135-136, doi: 10.1109/OIC.2012.6224486.

Boynton, A. et al., "Characterization of Systematic Process Variation in a Silicon Photonic Platform," 2017 IEEE Optical Interconnects Conference (OI), Santa Fe, NM, 2017, pp. 11-12, doi: 10.1109/OIC.2017.7965506.

Amatya, R. et al., "Low Power Thermal Tuning of Second-order Microring Resonators," 2007 Conference on Lasers and Electro-Optics (CLEO), Baltimore, MD, pp. 1-2, doi: 10.1109/CLEO.2007.4452439.

(Continued)

*Primary Examiner* — Mariam Qureshi
(74) *Attorney, Agent, or Firm* — Martin I. Finston; Mark A. Dodd (57) ABSTRACT

A thermally tunable microresonator device with enhanced thermal confinement for greater efficiency is provided. A thermal confinement structure is electrically connected in series with the heater element used for tuning the microresonator. The heater element is conformed in a circular arc concentric with the microresonator, the thermal confinement structure comprises two or more tiers, and each tier comprises at least one metal trace conformed in a circular arc concentric with the microresonator.

9 Claims, 5 Drawing Sheets

(56) References Cited

OTHER PUBLICATIONS

Cunningham, J. E. et al., "Highly-Efficient Thermally-Tuned Resonant Optical Filters," Optics Express, 2010, vol. 18, pp. 19055-19063.

Qiu, C. et al., "Wavelength Tracking with Thermally Controlled Silicon Resonators," Optics Express. 2011, vol. 19, pp. 5143-5148.

Timurdogan, E. et al., "Automated Wavelength Recovery for Microring Resonators," in Conference on Lasers and Electro-Optics 2012, OSA Technical Digest (online) (Optical Society of America, 2012), paper CM2M.1.

Zheng, X, et al., "Enhanced Optical Bistability from Self-Heating Due to Free Carrier Absorption in Substrate Removed Silicon Ring Modulators," Optics Express, 2012, vol. 20, pp. 11478-11486.

Derose, C. T. et al., "Thermal Crosstalk Limits for Silicon Photonic DWDM Interconnects," 2014 Optical Interconnects Conference, San Diego, CA, USA, 2014, pp. 125-126, doi: 10.1109/OIC.2014.6886111.

Timurdogan, E. et al., "An Ultralow Power Athermal Silicon Modulator." Nature Communications, 2014, vol. 5, 4008 (2014). https://doi.org/10.1038/ncomms5008.

Derose, C. et al., "Integrated RF Silicon Photonics from High Power Photodiodes to Linear Modulators," Advanced Photonics for Communications, OSA Technical Digest (online) (Optical Society of America, 2014), paper IW2A.1.

M. T. Wade et al., "Energy-Efficient Active Photonics in a Zero-Change, State-of-the-Art CMOS process," OFC 2014, San Francisco, CA, USA, 2014, pp. 1-3, doi: 10.1364/OFC.2014.Tu2E.7.

Zheng, X. et al., "A High-Speed, Tunable Silicon Photonic Ring Modulator Integrated with Ultra-Efficient Active Wavelength Control," Optics Express, 2014, vol. 22, pp. 12628-12633.

Su, Z. et al., "An Interior-Ridge Silicon Microring Switch with Integrated Thermal Tuner," Advanced Photonics, 2015, OSA Technical Digest (online) (Optical Society of America, 2015), paper IM2B.5.

Sun, Z., et al., Martinez, A. & Wang, F. Optical Modulators with 2D Layered Materials. Nature Photonics, 2016, vol. 10, pp. 227-238 (2016).

Yu, L. et al., "Thermally Tunable Silicon Photonic Microdisk Resonator with Transparent Graphene Nanoheaters," Optica, 2016, vol. 3, pp. 159-166.

Timurdogan, E. et al., "A One Femtojoule Athermal Silicon Modulator," Nature Communications, 2008, vol. 5, 4008, Jun. 11, 2014, arXiv:1312.2683 [physic.optics].

Lu, G .-W. et al., "High-temperature-resistant silicon-polymer hybrid modulator operating at up to 200Gbits-1 for energy-efficient datacenters and harsh-environment applications," Nature Communications, 2020, vol. 11, pp. 4224, 9 pages.

Yoon, G. H. et al., "Topology optimization of time-transient heat conduction for thermo-optic silicon modulators," International Journal of Heat and Mass Transfer, 2020, vol. 157, pp. 119862, 11 pages.

Lee, S. et al., "Thermal conductivity reduction by scallop shaped surface modulation in silicon nanowires," Appl. Phys. Lett., 2020, vol. 116, pp. 203901, 6 pages.

Yamaoka, S. et al., "Directly modulated membrane lasers with 108 GHz bandwidth on a high-thermal-conductivity silicon carbide substrate," Nature Photonics, 2021, vol. 15, pp. 28-35.

Jeyaselvan, V. et al., "Thermally-induced optical modulation in a vanadium dioxide-on-silicon waveguide," OSA Continuum, 2020, vol. 3, pp. 132-142.

Jafari, O. et al., "Mach-Zehnder Silicon Photonic Modulator Assisted by Phase-Shifted Bragg Gratings," IEEE Photonics Technology Letters, 2020, vol. 32, pp. 445-448.

Lu, G-W. et al., "High-Temperature-Resistant Silicon-Polymer Hybrid Modulator Operating at up to 200 Gbit s-1 for Energy-Efficient Datacentres and Harsh-Environment Applications," Nature Communications, 2020, vol. 11, 4224.

Yoon, G. H. et al., "Topology Optimization of Time-Transient Heat Conduction for Thermo-Optic Silicon Modulators," International Journal of Heat and Mass Transfer , 2020, vol. 157, 119862.

Lee, S. et al., Thermal Conductivity Reduction by Scallop Shaped Surface Modulation in Silicon Nanowires, Applied Physics Letters, 2020, vol. 116, 203901.

Jafari, O. et al., "Mach-Zehnder Silicon Photonic Modulator Assisted by Phase-Shifted Bragg Gratings," IEEE Photonics Technology Letters, vol. 32, pp. 445-448.

Li, Y. et al., "Mechanism and Optimization of a Graphene/Silicon Hybrid Diode Terahertz Modulator," ACS Applied Electroics Materials, 2020, vol. 2, pp. 1953-1959.

\* cited by examiner

CONCENTRATED THERMAL TUNER FOR OPTICAL MICRODISK DEVICES

CROSS-REFERENCE TO RELATED APPLICATION

This application claims the benefit of U.S. Provisional Application No. 63/004,640, filed Apr. 3, 2020, the entirety of which is hereby incorporated herein by reference.

STATEMENT OF GOVERNMENT INTEREST

This invention was made with United States Government support under Contract No. DE-NA0003525 between National Technology & Engineering Solutions of Sandia, LLC and the United States Department of Energy/National Nuclear Security Administration. The United States Government has certain rights in this invention.

FIELD OF THE INVENTION

The invention relates to the field of silicon photonics, and more particularly to thermal tuning of silicon microresonators and related devices.

ART BACKGROUND

In the field of photonic integration, the ability to tune optical elements for operation at specified wavelengths is an important feature. Tuning is important to compensate for temperature fluctuations, to compensate for deviations from nominal manufacturing specifications, and to facilitate channel selection, among other things.

Silicon has a high thermo-optic coefficient relative to other CMOS-compatible semiconductor materials as well as to compound semiconductor materials. For that reason, designing thermally tunable silicon devices has been an active area of development.

Silicon microdisk and microring devices, for example, can be thermally tuned. Devices in this category include resonators and modulators. These are resonant devices. Thermal tuning is achieved by shifting the microdisk or microring resonance with a temperature change, which acts through the silicon thermo-optic effect.

Active temperature changes are effectuated by an electric heater, which is typically fabricated as a strip or bar of silicon that undergoes resistive heating when an electric current intended for that purpose passes through it. Other materials, such as graphene, have also been proposed for use as resistive heaters.

There are several possible configurations in which a silicon heater can be placed in order for it to serve as the thermal tuner on an integrated silicon photonic circuit. In external heater configurations, the heater is physically displaced from, e.g., the microdisk or microring. In integrated heater configurations, by contrast, the temperature change is generated by passing the heating current through a designated portion of the silicon resonator body itself, which has been doped to a suitable level of resistivity.

An illustrative example of an integrated heater is provided in the research paper, William A. Zortman et al., "Integrated CMOS Compatible Low Power 10 Gbps Silicon Photonic Heater-Modulator," *Optical Fiber Communications Conference* 2012, Los Angeles, California (Mar. 4-8, 2012), hereinafter "Zortman 2012," the entirety of which is hereby incorporated herein by reference.

The device described in Zortman 2012 is an integrated silicon microdisk heater-modulator 2 µm in diameter. Modulation takes place by the plasma dispersion effect in a vertical PN junction that covers $\pi$ radians of the device and is limited to one side of the device. An oxide electrical isolation strip separates the ohmic modulation contacts from the ohmic heater contacts. The heater is a silicon strip doped with phosphorus to a carrier density of $10^{18}$ cm$^{-3}$ for a resistance of 200$\Omega$.

In general, integrated heaters are more efficient than external heaters. However, the optical signal interacts directly with the integrated heater, which can lead to scattering and signal distortion. Consequently, external heater modulators are preferable for some applications, especially when the arriving signal is already highly attenuated from long-range transmission or another cause.

Hence, there is a need for new modulator designs that include external heaters that operate with greater efficiency.

SUMMARY OF THE INVENTION

Ideally, the heat generated in an external heater would remain localized in the vicinity of the modulator so that it could effectuate tuning with maximum efficiency. As a practical matter, though, heat propagates away from the heater and raises the temperature of the bulk material in which the heater is embedded.

We performed numerical simulations to identify the main mechanism that drains heat from the thermal tuner, thereby reducing its efficiency. We found that the main route for loss of heat is on the metal lines, typically aluminum traces, that power the heater.

To counter this loss of heat, we have devised new designs in which the metal lines that power the heater also serve as a concentrator for concentrating the heat back onto the modulator, and as a reservoir to keep the heat localized near the modulator.

Our new designs include configurations in which the metal lines powering the heater describe circular arcs that wrap around the modulator. Other developers have published designs in which the heater wraps around the modulator. However, we believe we are the first to mitigate the heat-loss paths through the metal power-supply lines in a way that thermally restricts the outflow of generated heat from the locality of its source.

A further benefit of our designs is that they can potentially reduce crosstalk on platforms that carry large multiplicities of integrated modulators. That is, each modulator on such a platform will typically have its own thermal tuner. But the heat generated for the purpose of tuning a particular modulator could propagate far enough to affect the tuning of neighboring modulators. Our designs can potentially mitigate this tendency both by increasing efficiency so that less heat needs to be generated per modulator, and by confining the generated heat.

Accordingly, the present invention, in embodiments, relates to an apparatus comprising an optical microresonator, a semiconductor heater element for tuning the microresonator, and a thermal confinement structure electrically connected in series with the heater element. Arrangements considered to be "connected in series" in this regard include arrangements in which the thermal confinement structure has two or more parts, each of which is individually connected in series with the heater element.

As used herein, the term "microresonator" comprises both microring resonators and microdisk resonators, and it comprises microresonator devices used for optical modulation.

In embodiments, the heater element is conformed in a circular arc concentric with the microresonator, the thermal confinement structure comprises two or more tiers, and each tier comprises at least one metal trace conformed in a circular arc concentric with the microresonator.

In embodiments, each tier of the thermal confinement structure comprises two mirror-symmetric, arcuate metal traces. For convenience, and without loss of generality, we refer to these traces as the "left-hand trace" and the "right-hand trace", respectively. In some such embodiments, the left-hand traces of all of the tiers are serially connected in a left-hand serpentine structure, the right-hand traces of all of the tiers are serially connected in a right-hand serpentine structure, and the heater element is serially connected between the left-hand serpentine structure and the right-hand serpentine structure.

In embodiments, the thermal confinement structure has exactly three tiers, and each tier has exactly two metal traces conformed in circular arcs and arranged in mirror symmetry to each other.

In embodiments, the heater element has an edge-to-edge separation $d_{hr}$ from the microresonator, the respective tiers have an edge-to-edge separation $d_t$ from each other, there is an innermost tier with an edge-to-edge separation of $d_t$ from the heater element, and $d_{hr}$ is substantially equal to $d_t$. By "substantially equal" in this regard is meant equal to within manufacturing tolerances.

In embodiments, the heater element and the metal traces of all of the tiers are conformed in circular arcs of 180° or more.

In the examples described below, the optical microresonator and the heater element are fabricated in silicon, and the thermal confinement structure is defined in a higher-lying metallization layer of aluminum, for example. This is very advantageous because the fabrication can be based on well-established CMOS technology.

However, choice of materials should not be understood as limiting the scope of the present invention. For example, alternate materials as known in the art may be used for the microresonator and heater element without departing from the spirit and scope of the invention.

DETAILED DESCRIPTION

Figure 1:
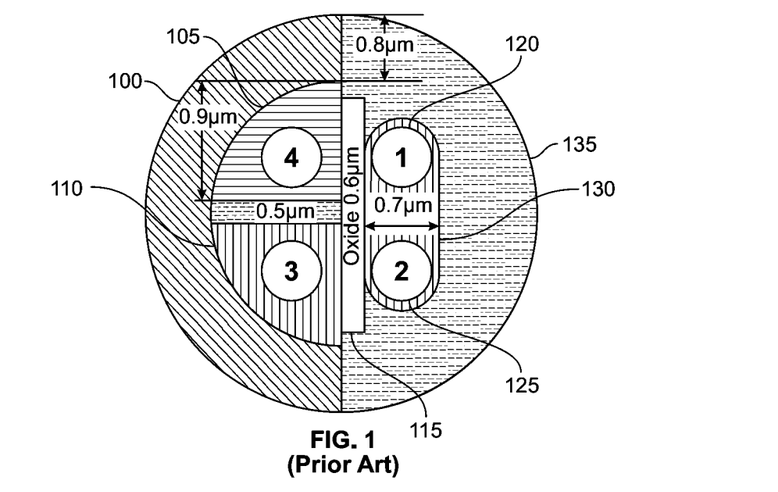
FIG. 1 is a cartoon drawing of an integrated microdisk heater modulator of the prior art.

FIG. 1 is a cartoon drawing of the integrated microdisk heater modulator reported in Zortman 2012 cited above. The fabrication process described in Zortman 2012 can be used to make example implementations of our new external heater designs. That process is based on conventional CMOS techniques that are well known and need not be described here in detail. The modifications needed for external placement (instead of integration) of the heater will be readily apparent to those skilled in the art.

As shown, the heater modulator of FIG. 1 has a radius of 2 μm. It includes a 180° vertical p-n junction 100 doped to about $10^{18}$ cm$^{-3}$, a p-ohmic modulation contact 105 doped to about $10^{20}$ cm$^{-3}$, an n-ohmic modulation contact 110 doped to about $10^{20}$ cm$^{-3}$, and an oxide electrical isolation strip 115 that separates the ohmic modulation contacts from the ohmic heater contacts 120, 125 for heater 130. The heater is a silicon strip doped with phosphorus to $10^{18}$ cm$^{-3}$. It has a resistance of 200Ω. Shown surrounding the heater on three sides is intrinsic silicon region 135, which is p-type at a carrier concentration of about $10^{14}$ cm$^{-3}$.

Figure 2:
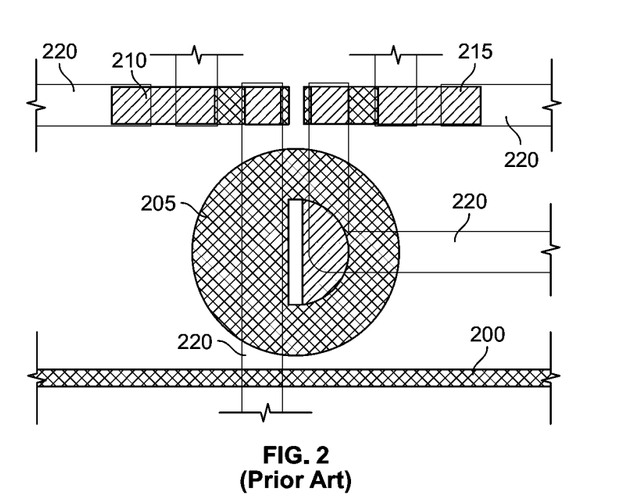
FIG. 2 is a simplified layout of an external heater design of the prior art.
Figure 3:
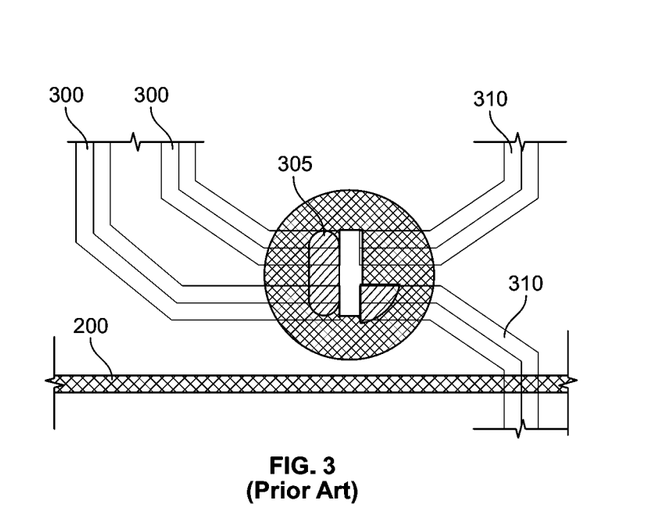
FIG. 3 is a simplified layout of an integrated heater design of the prior art.

For purposes of comparison, we simulated and subsequently fabricated and tested comparable modulators using an external heater and an integrated heater, respectfully. A simplified layout of the external heater design is shown in FIG. 2, and a simplified layout of the integrated heater design is shown in FIG. 3. In both figures, an input-output waveguide 200 is shown extending horizontally across the bottom of the figure. The waveguide is situated within an optical coupling distance of the microdisk resonator 205.

In FIG. 2, two bar-shaped heater elements 210, 215 are shown, each with its own pair of power-supply lines 220.

In FIG. 3, the power-supply lines 300 for the heater 305 are explicitly shown on the left-hand side of the figure, and the voltage-supply lines 310 for the modulator are explicitly shown on the right-hand side.

These comparative designs were based on a 4-μm-diameter silicon microdisk encased in silicon dioxide on a silicon wafer. Simulations were used to optimize the efficiency of the designs prior to fabrication. Efficiency, in this regard, describes the amount by which the resonant wavelength is shifted per unit of electric power.

Our studies predicted, and later confirmed, an efficiency of about 0.26 nm/mW for the external heater design and an efficiency of about 1.39 nm/mW for the integrated design. We also found that the efficiency of the external heater design could be increased to 0.38 nm/mW by removing material from the backside of the bulk substrate, i.e., by drilling a hole through the silicon handle all the way to the modulator device.

Figure 4:
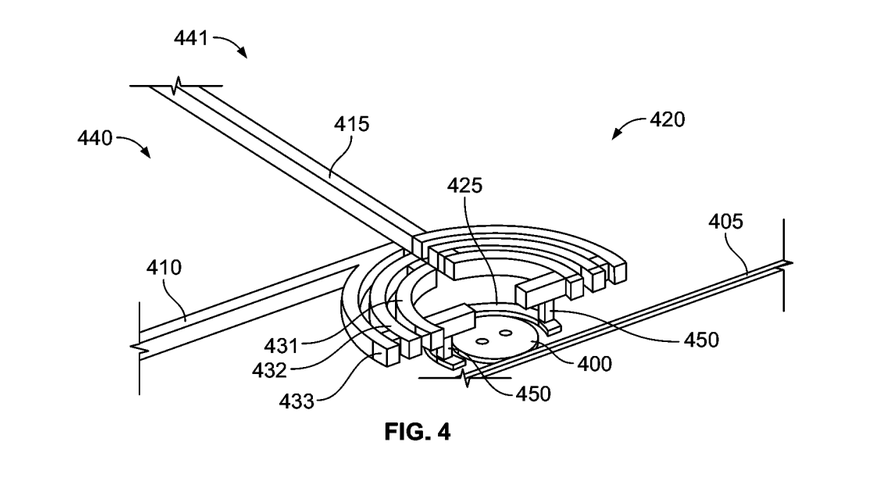
FIG. 4 is a perspective drawing of a heater-modulator according to the present invention, in an illustrative example.

FIG. 4 is a perspective drawing of our new heater-modulator in an illustrative example. The microdisk modulator 400 is shown at center bottom, near an input-output waveguide 405 that runs horizontally across the bottom of the figure. At left center, one power-input line 410 is shown extending from the left-hand edge of the figure. The second input power line 415 is shown extending from the top edge of the figure.

As shown in the figure, each of the two power-supply lines terminates at one end of a thermal confinement structure 420. In the present example, and as shown in the figure, both power-supply lines are formed in the same metallization layer as the thermal confinement structure, and they are continuous with it. Likewise, the silicon heater 425 and the silicon microdisk 400 are formed in the same layer.

As can be seen in the figure, the thermal confinement structure includes several nested tiers 431, 432, 433 that are concentric and that wrap around the modulator along circular arcs. By "nested" is meant that different tiers have different radii, so that a sequence of circles within circles is defined, with each tier lying along a respective circle. The circles are concentric with the microdisk. This concentricity is desirable because it helps to maintain uniform heating of the microdisk, which is important for control of the optical resonance.

With further reference to the figure, it will be seen that in the present example, there are a total of three tiers. The total number of tiers is subject to variation and should not be viewed as limiting the scope of the present invention. However, an optimal number of tiers will maximize efficiency by balancing the heating and thermal confinement effects against the power and voltage requirements. Our simulations indicated that the implementation with three tiers was more efficient than an implementation with only a single tier. Thus, embodiments having two or more tiers would be preferable according to our current understanding.

It will also be seen that each tier has two sides that mirror each other. These are shown in the figure as respectively a left-hand side 440 and a right-hand side 441. On each side, the three tiers collectively define a serpentine structure. The serpentine structure consists of a series of serially connected arcs and the short straight segments that connect them. At the inner end of each serpentine structure, a vertical via 450 connects the innermost arc of the serpentine structure to a respective end of the silicon heater 425. In the example shown, the silicon heater is also shaped as a circular arc.

Turning again to FIG. 4, assume for illustrative purposes and without loss of generality that current enters the thermal confinement structure from the left. Accordingly, the current traverses the outermost arc of the left-hand serpentine structure, switches back through the middle arc, and switches back again through the innermost arc. From there, the current descends through a via, traverses the heater, and ascends through a second via to the innermost arc of the right-hand serpentine structure. The current then traverses the right-hand serpentine structure in a pattern that is the reverse of the left-hand traversal.

In the example of FIG. 4, each tier wraps halfway around the microdisk, i.e., it has an angular extent of 180°, and within each serpentine structure, each arc has an angular extent of 90°. The angular extents are not critical however, and variations are possible in which they take on greater or smaller values. This is discussed in greater detail below.

We performed a design study in which we varied the angular extent of the tiers, and in which we varied the separation distance between the microdisk and the arc of the heater. We simulated several designs, and we subsequently fabricated and tested them.

The designs that we studied all used a microdisk 4 μm in diameter, and all had the same layer thicknesses and the same waveguide dimensions.

FIGS. 5-8 are simplified layouts illustrating several designs that we simulated, fabricated and tested. In each design, the silicon heater was doped to a carrier density of about $2 \times 10^{18}$ cm$^{-3}$, yielding a heater resistance of about 100Ω. In all cases, the microdisk diameter was 4 μm (as mentioned above), the line width within the tiers was 0.75 μm, the edge-to edge spacing between tiers was 0.5 μm, and the center-to-center spacing between tiers was 0.87 μm. The (vertically projected) edge-to-edge separation between the heater and the innermost tier was also 0.5 μm in all cases.

In the baseline designs (FIG. 5 and FIG. 7), the edge-to-edge separation between the microdisk 400 and the heater 425 was 0.5 μm. For comparison, we also simulated, fabricated, and tested designs in which the microdisk-to-heater separation was 0.7 μm and 0.9 μm. (Although not included in the data presented below, we also fabricated designs in which the microdisk-to-heater separation was 1.5 μm.)

Figure 5:
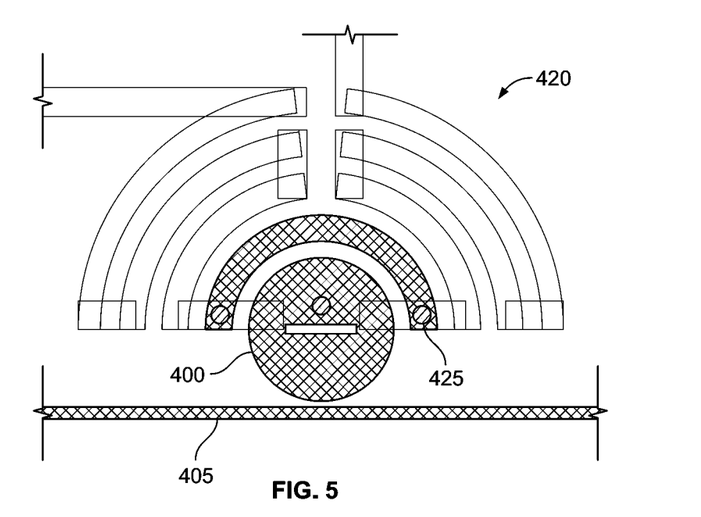
FIGS. 5-8 are simplified layouts illustrating several new designs for a heater-modulator that we used in a design study.
Figure 7:
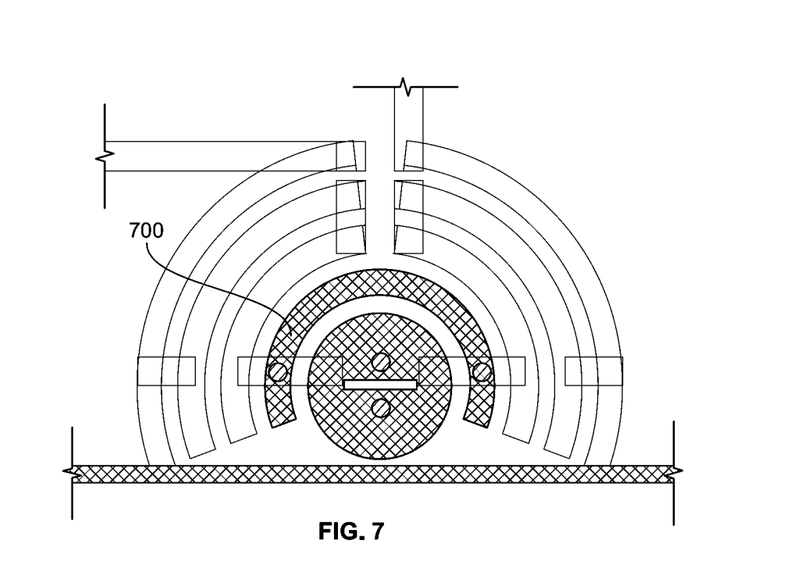

FIG. 5 shows a "semicircle" design in which each tier has an angular extent of 180°. FIG. 7 shows a "wraparound" design in which the arc of the heater element 700 was extended beyond 180° by an amount judged feasible without interfering with the waveguide. The total arc in this design was approximately 240°.

Figure 6:
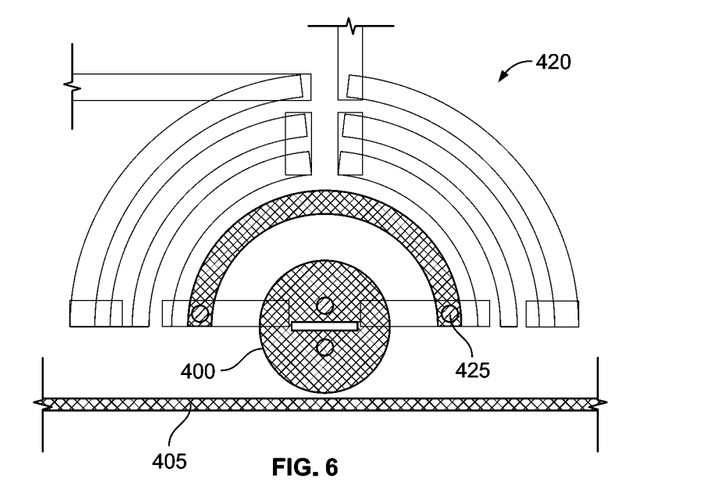
Figure 8:
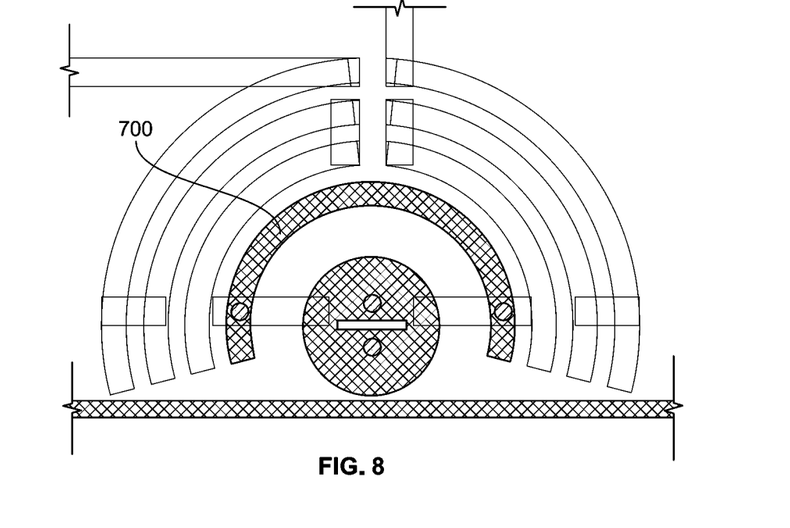

FIG. 6 and FIG. 8 show designs with increased microdisk-to-heater separation. FIG. 6 shows a semicircle design, and FIG. 8 shows a wraparound design.

Our simulations agreed within 85% with our experimental measurements.

Figure 9:
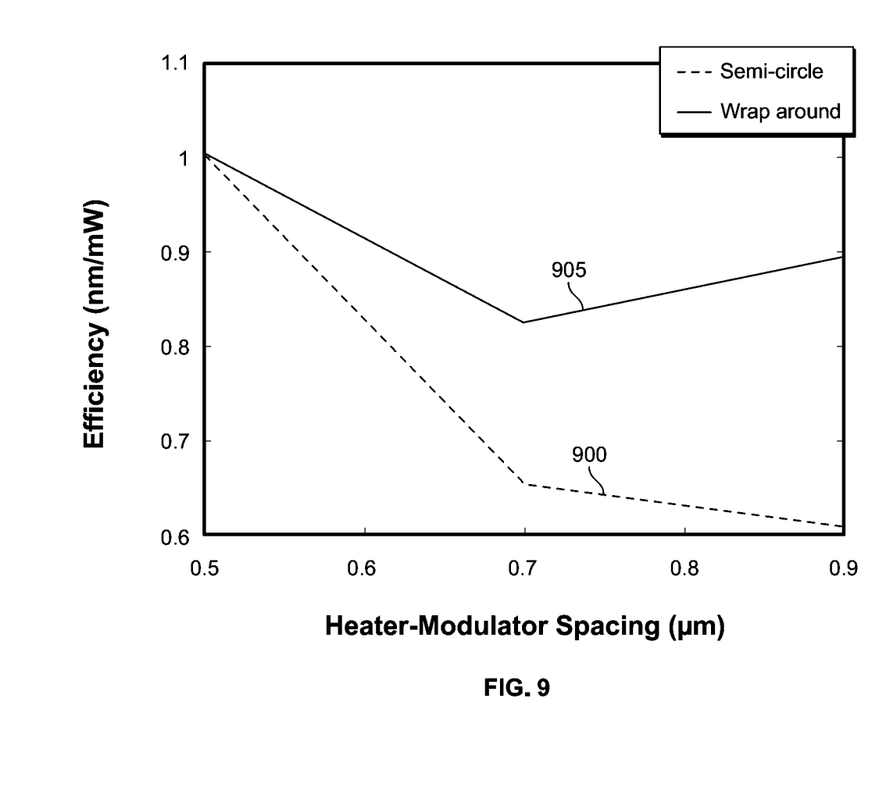
FIG. 9 is a graph of tuning efficiency versus microdisk-to-heater separation in a series of designs for a heater-modulator. Two plots are provided. The upper plot is for "semicircle" designs in which each a thermal confinement structure has an angular extent of 180°. The lower plot is for "wraparound" designs in which the thermal confinement structure has an angular extent greater than 180°.

FIG. 9 is a graph of tuning efficiency versus the microdisk-to-heater separation. Two plots are provided. The lower plot 900 is for semicircle designs as shown for example in FIGS. 5 and 6. The upper plot 905 is for wraparound designs as shown for example in FIGS. 7 and 8.

To generate the plots in FIG. 9, we used an input power of 4.9 mW for the semicircle designs and an input power of 4.99 mW for the wraparound designs. As can be seen from the figure, the efficiencies of the semicircle and wraparound designs were similar at a separation of 0.5 μm. We believe that is because there was only a small difference in the length of the heater element between the two designs.

It will be seen in the figure that the efficiency has an initial sharp drop as the spacing grows larger than 0.5 μm. Beyond a spacing of 0.7 μm, the efficiency of the semicircle design is seen to continue to drop, but more slowly. By contrast, the wraparound design initially drops in efficiency more slowly than the semicircle design. For separations greater than 0.7 μm, the efficiency of the wraparound design is seen to increase.

Although we do not wish to be limited by mechanism, we currently attribute the observed decrease in efficiency to the increasing distance between the heater and the modulator. We attribute the countervailing trend in the wraparound design to an increase in the total volume of metal serving as a localized thermal reservoir.

When comparing our new designs with baseline designs using a pair of external heater bars, it should be noted that the vertical connections to the heater elements affect the efficiency. That is, these vertical connections are typically made through tungsten vias, which are resistive enough to generate a significant amount of waste heat. When a single arcuate heater element is used instead of a pair of heater bars, the total number of these vias can be reduced by half, i.e., from four vias to only two vias.

Our results showed that an efficiency of 1 nm/mW or more is achievable by our methods. By contrast, we found an efficiency of about 0.38 nm/mW with a comparative design using a pair of external heater bars and with backside substrate removal as described above. With backside substrate removal, we believe that our new designs could achieve efficiencies even greater than 1 nm/mW. Accordingly, we believe that improvements in efficiency of more than threefold can be achieved.

The invention claimed is:
1. Apparatus comprising:
an optical microresonator;
a semiconductor heater element for tuning the microresonator; and
a thermal confinement structure electrically connected in series with the heater element, wherein:
the heater element is conformed in a circular arc concentric with the microresonator;

the thermal confinement structure comprises two or more tiers, each tier comprising at least one metal trace conformed in a circular arc concentric with the microresonator;

each tier of the thermal confinement structure comprises two mirror-symmetric, arcuate metal traces, which are here denominated the "left-hand trace" and the "right-hand trace";

the left-hand traces of all of the tiers are serially connected in a left-hand serpentine structure;

the right-hand traces of all of the tiers are serially connected in a right-hand serpentine structure; and the heater element is serially connected between the left-hand serpentine structure and the right-hand serpentine structure.

2. The apparatus of claim 1, wherein: the thermal confinement structure has exactly three tiers, and each tier has exactly two metal traces conformed in circular arcs and arranged in mirror symmetry to each other.

3. The apparatus of claim 1, wherein: the heater element has an edge-to-edge separation $d_{hr}$ from the microresonator, the respective tiers have an edge-to-edge separation $d_t$ from each other, there is an innermost tier with an edge-to-edge separation of $d_t$ from the heater element, and $d_{hr}$ is substantially equal to $d_t$.

4. The apparatus of claim 1, wherein the heater element and the metal traces of all of the tiers are conformed in circular arcs of at least 180°.

5. The apparatus of claim 1, wherein the optical microresonator is conformed as an optical modulator.

6. The apparatus of claim 1, wherein the optical microresonator is conformed as a microdisk resonator.

7. The apparatus of claim 1, wherein the optical microresonator is conformed as a microring resonator.

8. The apparatus of claim 1, wherein the optical microresonator and the heater element are fabricated in silicon.

9. The apparatus of claim 1, wherein the metal traces of the thermal confinement structure are aluminum traces connected to the heater element by vertical vias.

* * * * *